(12) United States Patent
Schütz et al.

(10) Patent No.: US 12,195,103 B2
(45) Date of Patent: Jan. 14, 2025

(54) CONTROL SYSTEM FOR VEHICLE

(71) Applicant: Bozzio AG, Nidau (CH)

(72) Inventors: Daniel Schütz, Aarberg (CH); Simon Schnider, Wabern (CH); Marc von Kaenel, Bern (CH)

(73) Assignee: BOZZIO AG, Nidau (CH)

( * ) Notice: Subject to any disclaimer, the term of this patent is extended or adjusted under 35 U.S.C. 154(b) by 12 days.

(21) Appl. No.: 18/044,656

(22) PCT Filed: Sep. 7, 2021

(86) PCT No.: PCT/IB2021/058130
§ 371 (c)(1),
(2) Date: Mar. 9, 2023

(87) PCT Pub. No.: WO2022/053930
PCT Pub. Date: Mar. 17, 2022

(65) Prior Publication Data
US 2023/0365184 A1 Nov. 16, 2023

(30) Foreign Application Priority Data

Sep. 10, 2020 (CH) ........................................ 1132/20
Nov. 26, 2020 (EP) ..................................... 20209991

(51) Int. Cl.
*B62D 5/00* (2006.01)
*B60K 35/00* (2006.01)
(Continued)

(52) U.S. Cl.
CPC .............. *B62D 5/006* (2013.01); *B60K 35/00* (2013.01); *B60K 35/10* (2024.01); *B60K 35/25* (2024.01);
(Continued)

(58) Field of Classification Search
CPC .. B60K 35/20; B60K 35/10; B60K 2360/131; B60K 2360/128; B60K 2360/126; B60K 35/25; B60K 35/00; B62D 5/006
See application file for complete search history.

(56) References Cited

U.S. PATENT DOCUMENTS 4,627,522 A 12/1986 Ulrich et al.
5,553,684 A 9/1996 Bolduc
(Continued)

FOREIGN PATENT DOCUMENTS

DE 19912169 A1 7/2000
DE 102018121178 A1 * 3/2019 ............. G01B 11/16
(Continued)

OTHER PUBLICATIONS

International Search Report issued in Application No. PCT/IB2021/058130 dated Nov. 22, 2021.
Written Opinion for PCT/IB2021/058130 dated Nov. 22, 2021.

*Primary Examiner* — Paul N Dickson
*Assistant Examiner* — Maxwell L Meshaka
(74) *Attorney, Agent, or Firm* — Pearne & Gordon LLP

(57) ABSTRACT

An input module, able to be retrofitted in a vehicle, for controlling a vehicle, having a haptic input element, at least one sensor, at least one electronic circuit that is able to determine a sensor signal, at least one force feedback element, and a housing having at least one electrical interface. The sensor, the electronic circuit and the force feedback element are accommodated completely in the housing and the input element is accommodated partially in the housing. The force feedback is calculated in the electronic circuit and is able to be adjusted dynamically and adapted to a specific the driver. The invention also relates to a modular control system having the input module cited above, a data bus and at least one central distributor module.

23 Claims, 6 Drawing Sheets

(51) Int. Cl.
*B60K 35/10* (2024.01)
*B60K 35/25* (2024.01)

(52) U.S. Cl.
CPC .. *B60K 2360/126* (2024.01); *B60K 2360/128* (2024.01); *B60K 2360/131* (2024.01)

(56) References Cited

U.S. PATENT DOCUMENTS

| | | | | |
|---|---|---|---|---|
| 6,373,465 | B2* | 4/2002 | Jolly | G06F 3/0338 434/45 |
| 6,532,152 | B1* | 3/2003 | White | G06F 1/1656 312/223.1 |
| 7,124,648 | B2* | 10/2006 | Shibazaki | G05G 5/04 73/862.08 |
| 9,139,094 | B2* | 9/2015 | Aubert Sola-Morales | B60K 35/10 |
| 10,514,764 | B2* | 12/2019 | Vogt | B60K 35/10 |
| 11,447,013 | B2* | 9/2022 | Mirandola | B60K 35/212 |
| 2001/0052893 | A1* | 12/2001 | Jolly | G06F 3/0338 345/156 |
| 2004/0140145 | A1 | 7/2004 | Chernoff et al. | |
| 2004/0231434 | A1* | 11/2004 | Shibazaki | B60K 35/10 73/862.08 |
| 2005/0274563 | A1 | 12/2005 | Ahnafield | |
| 2009/0312918 | A1* | 12/2009 | Aubert Sola-Morales | B60K 20/02 701/51 |
| 2010/0235041 | A1 | 9/2010 | Aeberhard et al. | |
| 2018/0312193 | A1 | 11/2018 | Arnold | |
| 2019/0033973 | A1* | 1/2019 | Vogt | G06F 3/016 |
| 2021/0347263 | A1* | 11/2021 | Mirandola | B60K 35/212 |
| 2023/0365184 | A1* | 11/2023 | Sch?tz | B60K 35/28 |

FOREIGN PATENT DOCUMENTS

| | | | | |
|---|---|---|---|---|
| DE | 102022121742 | A1 * | 2/2024 | ............ B60K 35/10 |
| EP | 1595766 | A2 | 11/2005 | |
| EP | 2214945 | B1 | 9/2011 | |
| EP | 3916523 | A1 * | 12/2021 | ............ B60K 35/00 |
| FR | 3074770 | B1 * | 11/2019 | ............ B60R 16/03 |
| FR | 3084940 | A1 | 2/2020 | |
| KR | 100535010 | B1 * | 12/2005 | |
| WO | 2021048254 | A1 | 3/2021 | |
| WO | WO-2024006621 | A1 * | 1/2024 | |

* cited by examiner

CONTROL SYSTEM FOR VEHICLE

TECHNICAL FIELD

The invention relates to a control system which has no mechanical connection between input unit and wheels, a so-called drive by wire system. In particular, the invention relates to a control system having an active and dynamic force feedback element.

PRIOR ART

Various approaches are known from the prior art in which control requests are transmitted to the vehicle by means of alternative input elements without conventional vehicle control elements, such as a steering wheel, a brake pedal and/or an accelerator pedal having to be operated directly by the driver. For example, a steering request can be entered using a joystick instead of the steering wheel, or a braking and/or acceleration request using an input element operated by hand instead of a foot pedal.

It is also known from the prior art that feedback systems, so-called force feedback systems, can be used to feed relevant driving dynamics information, for example regarding a steering force or braking point, back to the driver. The feedback is usually generated mechanically via spring/damper systems or hydraulically. This has the disadvantage that the feedback cannot be configured dynamically. Such systems cannot, for example, generate speed-dependent, position-dependent and/or force-dependent feedback. In addition, an individual adjustment of the feedback system requires a physical modification of the input module, which is complex in practice.

EP2214945 B1 describes a handicapped accessible vehicle which is equipped with a steering and brake input module, wherein various adapted input units can be mounted interchangeably on the module. For this purpose, a mechanical interface is provided between the input unit and the feedback unit, by means of which input units can be exchanged according to the wishes of the user. Although this allows the control system to be easily and quickly adapted to users with different physical disabilities and needs, the mechanical interface between the input unit and the feedback unit is a disadvantage in terms of space requirements and aesthetics.

US2018312193 A1 describes a control module with an input element comprising a sensor for determining the position of the input element and with a redundant servo mechanism that feeds back to the input element. With this invention, the sensor signals are transferred from a control module via an electrical interface to a separate monitoring unit for calculating the feedback message. The calculation of the feedback in the monitoring unit thus takes place outside the control module.

US2004140145 A1 describes a vehicle driver control input assembly comprising a seat having a steering wheel structure configured to provide non-mechanical steering signals to a steer by wire system. The steering wheel structure can be folded under the seat for storage. A variety of selectable driver control input devices may be interchangeably connected to the vehicle to provide steering, braking and/or acceleration signals to the vehicle as desired.

U.S. Pat. No. 5,553,684 A describes a remotely controlled system for operating the acceleration and brake pedals of a vehicle, wherein a limited physical input is translated into the desired vehicle acceleration and braking. Optionally, a control element, which is a joystick or lever, is connected to a feedback mechanism that allows the driver to adjust the perceived resistance when the lever moves. The feedback is based on a passive mechanical spring with hydraulic oil dampers. This passive feedback cannot be adjusted for driving dynamics circumstances, such as the current speed of the vehicle.

DE19912169 A1 describes a system with an electronically controlled steering control device on the steering gear or on both steered front wheels, a steering wheel sensor that detects the driver's steering request, and a feedback actuator unit that transmits the road feedback to the driver via the steering wheel. The driver's steering requests are adjusted according to the driving dynamics parameters. The feedback actuator contains a steering wheel control device coupled to the steering wheel via a gearbox and a steering wheel controller. The system does not provide input devices. The steering continues to be performed with a classic steering wheel and the feedback actuators are accommodated in the steering column.

US2005274563 A1 describes a joystick-controlled driving system, wherein acceleration and braking functions are operated by the driver by means of the joystick and the steering function continues to be performed with the steering wheel of the vehicle. Two independent actuators operate the pedals mechanically. The brake is implemented redundantly.

U.S. Pat. No. 4,627,522 A describes a manual operating mechanism for a vehicle engine throttle and brake with a manually operated input lever. The acceleration is realized by means of a cable pull, the brake by means of a linkage. The system has no feedback mechanism.

EP1595766 describes a device for actuating the steering in motor vehicles. The device comprises a mechanical unit for operating the steering system, a transmission coupling between the mechanical unit and a positioning wheel, a control element, a position converter, and a control unit for receiving steering signals. The device is intended exclusively for the operation of the steering. Other functions, such as braking and/or acceleration, cannot be operated by means of this device.

In the present invention, a solution for a control system is to be found that is efficient and robust and overcomes the shortcomings of the prior art.

DESCRIPTION OF THE INVENTION

It is a goal of the invention to provide a control system that is robust and reliable and that can be easily adapted to the preferences of the driver.

Preferably, the control system should be simply and reversibly mountable.

Furthermore, the control system should be equipped to transmit the driver's control request precisely and reliably to the steering, braking and/or acceleration systems.

Ideally, control-relevant information about the driver and/or vehicle should be able to be included in order to adjust the control system.

According to the invention, this objective is achieved by the independent claims, as well as their subclaims.

Specifically, this objective is achieved by an input module, which is configured to be retrospectively fitted in the vehicle for controlling a vehicle with a haptic input element, at least one sensor, an electronic circuit that can determine a sensor signal, a force feedback element, and a housing with an electrical interface. The sensor, electronic circuitry, and force feedback element are fully accommodated in the housing, and the input element is partially accommodated in the housing. The input module is thus available as an integrated unit.

The housing is preferably a single component. However, the housing may also comprise two or even more components, provided that these components are mounted together in such a way that they are not interchangeable by the user. In a housing having several components, the mechanical interfaces between the input element, the sensors and the force feedback are arranged in the housing in such a way that they are inaccessible to the user. Different components of the housing may be installed so as to be movable relative to each other, for example rotationally movable. However, the individual components of the housing are not interchangeable or removable by the user.

The calculation of the force feedback is carried out in the at least one electronic circuit of the input module. The force feedback is dynamically adjusted. Thus, driving-specific parameters, such as the speed of the vehicle, the steering position, and/or the brake pressure, will be included in the calculation of the force feedback.

Furthermore, the input module is equipped in such a way that the force feedback is individually adjusted for the user by means of the electronic circuit.

These user-specific adjustments make it possible to take into account the wishes or preferences of the user, as well as specific physical characteristics, disabilities and/or abilities of the driver in the force feedback.

The user-specific adjustment is not based on physical modifications of the input module or the force feedback, but purely electronically. This means that the force feedback is adjusted based on user-specific software parameters.

Specific parameters of the force feedback element can therefore be set to meet these specific specifications.

The force feedback can be adjusted directly by the driver or a front seat passenger, for example by a driving instructor. For this purpose, a user interface, such as a sensor screen, a so-called touch screen, should be provided, which allows adjustment of the force feedback in the vehicle.

The input of the parameters can, for example, be transmitted from a display unit via a data bus to the electronic circuit.

It is also possible to pre-program certain force feedback settings in the electronic circuit so that they can then be selected by the user of the vehicle. For example, settings for different driving styles, so-called <<pre-sets>>, such as <<low>>, <<medium>> and/or <<strong>> feedback, can be predefined.

The driver or front seat passenger can thus carry out the desired setting of the force feedback in a simple and uncomplicated manner by selecting the desired preset.

The force feedback in these different pre-sets can be adjusted to achieve the best drivability for drivers in combination with the vehicle.

For example, the force feedback can be adjusted to increase the resistance of the movement of the input element. The force feedback can also be adjusted to reduce the resistance or to support the movement of the input element. In the latter case, the reactivity of the controlled control element is increased in relation to the force exerted by the driver. Increased resistance, on the other hand, causes a reduced reactivity of the controlled control element.

The force feedback can be adjusted to adjust the function that defines the feedback force depending on the position of the haptic element. For example, in a first mode, the feedback force may depend linearly on the position of the haptic element, and in a second mode it may depend exponentially on the position of the haptic element.

The force feedback can be adjusted to adjust the calculation function that defines the feedback force depending on the speed of the vehicle. For example, in a first mode, the feedback force may depend heavily on the speed, while in a second mode, it may depend less on the speed.

It is also possible that predefined settings of the pre-sets are further adjusted or modified by the driver. For this purpose, specific parameters of the force feedback can be adjusted by means of a user interface, for example a sensor screen, a so-called touch screen.

The force feedback can also be optionally adjusted vehicle-specifically, for example for a specific vehicle type or for vehicles from different manufacturers. This offers the advantage that individual characteristics of the vehicle are taken into account in the calculation of the feedback and thus makes the control of the vehicle safer and more user-friendly. The vehicle-specific adjustments make it possible to adjust the driving behavior for different vehicle types and/or for vehicles from different manufacturers.

Furthermore, the objective is achieved by a modular control system with the aforementioned input module, a data bus and a central distributor module, which is suitable for receiving signals via the data bus and outputting signals to the data bus.

Preferably, the modular control system comprises a plurality of redundant electrical interfaces via which the elements of the control system and/or elements of the vehicle can input control-relevant signals to the data bus and/or receive control-relevant signals via the data bus.

In order to meet required safety requirements, the input module comprises in each case several, preferably two, mutually redundant sensors, electronic circuits and/or electrical interfaces. By analogy, the data bus and the central distributor module are intrinsically redundant, i.e. they are each executed in multiple, preferably two, versions.

These redundant elements of the control system may also be intrinsically redundant, they may for example be implemented in a dual-strand form. An element is intrinsically redundant if it contains electrical components that are capable of performing the same function as their respective redundant component. If an element has two redundant components, it has two strands. In this version, there are two mutually independent strands. The two strands are able to communicate with each other. For safety reasons, preferably all components whose malfunction causes a failure of the respective element are present at least twice. The consequence of a failure is that an active element can no longer perform the functions assigned to it.

One can therefore speak of a dual redundancy, in which said elements are on the one hand intrinsically designed in a dual strand form, and are on the other hand each executed at least twice.

If a strand of a redundant element proves to be faulty, this strand is capable of automatically switching itself off. If the faulty strand is switched off, the other strand of the redundant element alone takes over the function of the element. This configuration contributes significantly to the safety of the overall system.

Preferably, the signal transmission for calculating the force feedback is in the form of a closed control loop, also referred to as a <<closed loop>>. In this embodiment, a setpoint is specified at the input module and an actual value is output at the actuator of the control element. The actual value is returned to the electronic circuit of the input module. The preferably redundantly implemented electronic circuit (350) then calculates the force feedback, taking into account the read actual value.

In a further embodiment, it is also possible that, in addition or as an alternative to this closed loop embodiment, vehicle-specific information, such as vehicle speed and/or steering column position, are included in the calculation of the force feedback by the preferably redundant electronic circuit (350).

The electronic circuit is equipped to receive signals of the input element, as well as vehicle-specific signals, which are available, for example, on a vehicle CAN bus. The calculation of the force feedback can be based on the input angle of the input element and/or on the travel of the input element. Furthermore, the force feedback algorithm calculated in the electronic circuit can take into account vehicle-specific data and/or gain factors for the degree of the feedback, for example <<low>>, <<medium>> or <<strong>>.

The implementation of the force feedback in a closed control loop ensures that the force feedback is continuously adjusted for the driving dynamics conditions. On the one hand, this improves the driver's driving experience. On the other hand, this direct feedback from the dynamically adjusted input element also contributes to driving safety.

Optionally, the modular control system may have one or more additional digital interfaces by means of which control-relevant signals can be entered into the data bus. Preferably, this digital interface can also retrieve signals from the data bus. For safety reasons, the digital interface is preferably implemented redundantly.

The digital interface mentioned can, for example, enable autonomous control of the vehicle.

Preferably, an <<override switch>> accessing the data bus acts in such a way that the signals read in via the digital interface are ignored. In this case, the control functions of the vehicle are again taken over by the input modules. Optionally, it is also possible that when the override switch is operated, the actuators are switched to de-energized and thus the digital interface as well as the input modules have no influence. In such a case, the control of the vehicle is carried out by means of the conventional steering wheel and the original accelerator and brake pedals. This configuration is particularly advantageous for autonomous vehicles with a safety driver or for driving school vehicles with a driving instructor in order to be able to take over and hand over the control of the vehicle at any time.

The input module provided in its housing and/or the system controller can easily be retrospectively fitted to the vehicle. The term "retrospectively fitted" in this context means that the input module and/or the system controller can be installed at any time after completion of the vehicle on the production line. The installation can be carried out either directly after the production process or at a later date. The installation of the input module and/or the control system therefore does not have to be provided for in the production process of the vehicle. Also, vehicles that can be retrospectively fitted need not be equipped with elements specifically provided for mounting the input module and/or the control system.

The vehicles that can be retrospectively fitted can also be driven without these components that can be retrospectively fitted. This means that an input module and/or control system installed in a vehicle can be removed from the vehicle and that the vehicle can be driven conventionally again after removal.

In particular, an input module and/or elements of the control system are considered retrospectively installable if they are suitable to be installed in addition to the conventional, vehicle's own elements in the finished vehicle after its completion.

Based on the physical integration of the input module within the housing, the sensor, the force feedback element, the electronic circuitry, and their connection to each other are substantially inaccessible. Substantially inaccessible in this context means that the housing must be dismantled with suitable tools to allow access to the elements mentioned. The protective housing contributes to the robustness of the entire input module.

In this sense, an input module is considered to be intended for retrospective fitting into a vehicle if that module has a mechanical and/or electrical interface to enable such subsequent installation.

The calculation of the sensor signals is in principle carried out in the electronic circuit of the input module.

The input module is connected via preferably dual redundant electrical interfaces to the preferably redundantly implemented data bus, for example a CAN bus. The signals calculated in the electronic circuit can thus be output to the data bus. On the other hand, the electronic circuit can also read signals from other elements connected to the data bus via the mentioned electrical interfaces. These other elements connected to the data bus include, for example, the central distributor module, actuators, an electronic acceleration module, the vehicle's own electronics, and/or other elements connected to the data bus.

Sensor signals are generated based on the operation of the input element and are calculated in the electronic circuit. Optionally, additional signals received via the data bus can be included in the calculation.

On the one hand, these signals can be transmitted to an electrical force feedback motor of the input module, which is dynamically adjusted as a result.

On the other hand, the signals can also be fed into the data bus and then retrieved via electrical interfaces of connected elements, such as the central distributor module, of actuators, of the electronic acceleration module and/or of the vehicle electronics.

The signal transmission takes place in the control system preferably exclusively electronically without a mechanical fallback level. It is therefore so-called <<drive by wire>> control. The preferred dual redundant design of the control system, or its control-relevant elements, contributes significantly to the safety and reliability of the function.

The main function of the central distributor module is to ensure coordinated internal signal transmission between the elements connected to the data bus. The distributor module ensures that the signals are transmitted to the correct element.

The distributor module can also serve as an interface to the outside. This means that in this case it is used for external signal transmission, which can be either wired via a data bus or <<wireless>>.

Control-relevant signals are fed into the data bus, for example, by input modules, actuators and/or vehicle's own elements. These signals transmit information about the driver, the control system and the vehicle, which is used to calculate the adjustment parameters, preferably by the electronic circuit.

Setting parameters of the input module can be defined to adjust the deflection, or the orientation and/or the movement of the conventional, vehicle's own control elements, such as the steering wheel, steering column and/or brake pedal.

The calculated control-relevant signals can be transmitted via the data bus, for example, to the electronics of an actuator. On the other hand, calculated signals can also be transmitted via the data bus to an electronic acceleration module that is connected to the engine control unit. The acceleration module is preferably not implemented redundantly. It is also possible that signals are transmitted via the data bus to the vehicle's own electronics. This is suitable, for example, for controlling secondary functions, such as lights, indicators, horn, windscreen wipers.

The calculated signals are also used to adjust the feedback motor of the input module. Since the electronic circuit outputs sensor signals to the data bus for controlling control-relevant elements on the one hand and receives signals that are output to the data bus by actuators, vehicle electronics and/or an electronic acceleration module on the other hand and uses them to parameterize the force feedback, there is a <<closed loop>> here. Essentially, the electronic circuit thus monitors the control elements and uses their feedback to determine the force feedback exerted on the input element.

The force feedback is based on an electrical feedback mechanism, preferably on an electrical feedback motor. Ideally, the force feedback can be adjusted, for example switched on and off.

An electrical force feedback mechanism has the advantage that the feedback strength can be dynamically adjusted. For example, the electrical force feedback can be adjusted for the steering function according to the speed of the vehicle. For example, the force feedback can be programmed so that the force feedback on the input element, which is a steering element, for example, is increased at higher driving speeds. In this case, the driver experiences increased resistance in the movement of the steering element, compared to a stationary or slowly moving vehicle, for example at walking pace.

However, the required deflection of a movement which is necessary for a desired control result can also be adjusted depending on the speed.

For example, for the same change of direction of the vehicle at high speed, a smaller deflection, or, depending on the type of the input element, a greater force must be exerted than in the stationary state of the vehicle, or during a low vehicle speed, such as during parking.

However, it is also possible to store parameters for signal determination. For example, driver-specific wishes determined in this way, such as general driving behavior or physical characteristics of the driver, and/or vehicle-specific information can be included in the calculation of the signal. Physical characteristics of the driver can be, among other things, his physical abilities, such as the range of physical strength, or his reaction speed.

The calculation of the feedback signal in the electronic circuit can therefore be based on dynamically read information in combination with stored parameters.

The input element is only partially accommodated in the housing, wherein the haptic portion of the input element intended for operation protrudes from the housing. This arrangement allows the user to operate the input element to control the vehicle.

The contact point between the user and the control module is thus outside the housing. Optionally, the haptic portion of the input element can be interchangeably attached. In this case, the connection point between the reversibly attachable haptic portion and the rest of the input element is accessible to the driver on the housing or outside the housing, so that the haptic portion can be exchanged without great effort.

The version of the input element can be selected appropriately depending on the control function to be performed, such as steering, braking and/or accelerating. A number of versions of haptic input elements are known from the prior art and are not specifically mentioned here.

Additional input elements may also be provided in the input module for operating secondary functions, such as lights, indicators, windscreen wipers, horn or other functions.

In order to separate the control of several control functions, it is possible to install several input modules with different functions in the vehicle. For example, the steering function may be fitted with a mini steering wheel in an ergonomically favorable position for operation with the right hand of the seated driver, while, for example, a combined accelerator/brake module may be positioned for ergonomically favorable operation with the driver's left hand. However, steering/accelerator/braking functions can also be combined in a single input module, such as a four-way joystick.

The integration of the steering/accelerator/and braking functions in a single input module offers the advantage that the driver can operate the vehicle using this single input element. The second hand remains free for the operation of other vehicle functions such as secondary or comfort functions. The operation of the vehicle is thus very simplified. Another advantage of an integrated steering/accelerator/and brake module is the reduced space requirement.

Further, non-safety-relevant additional functions can also be entered at a touch screen by the user of the vehicle by means of a sensor screen. However, the invention is not limited to these specific presets. Other advantageous embodiments of the input elements are conceivable and possible.

For the acceleration function, the signals generated in the input module are transmitted to the electronic acceleration module via the data bus. The vehicle's own engine control unit receives the calculated signals from the acceleration module and controls the vehicle engine. The conventional accelerator pedal of the vehicle is therefore inactive when the control system is activated to control the acceleration function. When the control system is switched off, the conventional accelerator pedal of the vehicle is active again.

In order to rule out malfunctions, the two-strand control system is implemented in a so-called "fail operational architecture". The redundant elements of the control system can carry out integrated self-diagnoses, which detect inadmissibilities and safely switch off a faulty strand of an element. The other strand of this element is equipped to perform the relevant function of the element on its own.

The detected inadmissibilities can then be communicated to the driver, for example visually and/or acoustically. For this purpose, the control system is preferably equipped with an acoustic and optical status module, such as a fault lamp and an alarm sound, a so-called "beeper".

Optionally, a diagnostic interface can be connected to the data bus to keep the user of the control system up to date about the current status and/or control-relevant information, for example. The user can be the driver who is controlling the vehicle or any other person who is monitoring the vehicle and/or the control system. This interface can also be used to install software updates and/or upload log entries. The diagnostic interface can be wired or wireless.

By analogy to the input module, the entire control system is also suitable for retrospective fitting in a vehicle with a combustion engine, with an electric motor or with a hybrid engine.

After installation of the control system, the vehicle can be driven selectively either conventionally, i.e. independently of the control system, or with the help of the fitted control system.

The control system may be further developed at a later stage, wherein the vehicle's own control functions remain unaffected.

Preferably, the control system can be switched on and off as desired. This is advantageous, for example, if a vehicle is driven alternately by a disabled person and by a physically non-impaired person. When changing drivers, the control system does not have to be installed or removed but can simply be switched on or off according to the needs of the driver. A quick driver change, for example on long journeys, can therefore be carried out easily and without great effort.

The control system can optionally also be equipped with a supporting operating mode, a Power Assisted Steering (PAS) mode. This operating mode can compensate for undesirable characteristics of the control system that affect the steering. Such undesirable characteristics caused by the control system are increased frictions, for example. The necessary compensation is calculated using a PAS algorithm and transmitted to the steering wheel by means of the steering actuator. The PAS algorithm is preferably realized without a torque sensor; optionally, however, a suitable redundant sensor can be used in the steering actuator. Preferably, the PAS can be selectively switched on and off.

BRIEF DESCRIPTION OF THE FIGURES

The invention is explained in more detail on the basis of the attached figures, wherein in the figures.

WAYS TO IMPLEMENT THE INVENTION

Figure 1A:
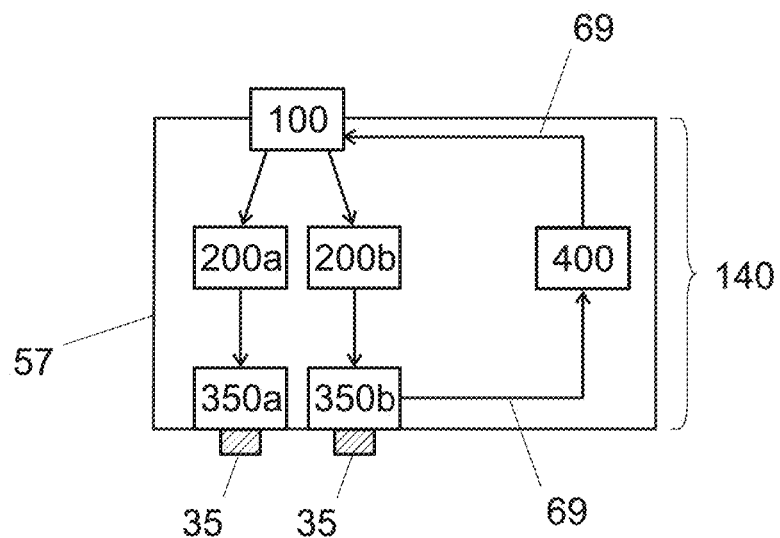
FIGS. 1a and 1b show a schematic overview of an embodiment of the control system, wherein
  1a shows a schematic representation of the input module, and
  1b shows a schematic representation of an exemplary embodiment of the control system.

A preferred exemplary embodiment according to the invention of the control system is described below on the basis of the schematic system overview shown in FIG. 1. FIG. 1a is a schematic representation of an input module 140 with a housing 57 in which an input element 100, two redundant sensors 200a, 200b, two redundant electronic circuits 350a, 350b, and a force feedback element 400 are accommodated, wherein a portion of the input element 100 protrudes from the housing, specifically the haptic portion 120 (shown in FIGS. 2 and 3) of this element.

Different exemplary embodiments of this haptic portion are possible and can be selected according to the driver's preferences. Haptic portions 120 may be, for example, a one-hand joystick, a four-way joystick, a two-way joystick, a mini steering wheel, a slider, motorcycle handlebars, a rocker arm, a toggle lever, or other suitable embodiments. The invention is not limited to specific haptic elements.

The control module 140 is connected via two redundant electrical interfaces 35 located outside the housing to a redundant data bus 77a, 77b, which is preferably a CAN bus. The data bus 77a, 77b is used for signal transmission between the elements connected to it. Two redundant central distributor modules 300a, 300b control the signal flow between the individual elements connected to the data bus. This is shown schematically in FIG. 1b.

Figure 1B:
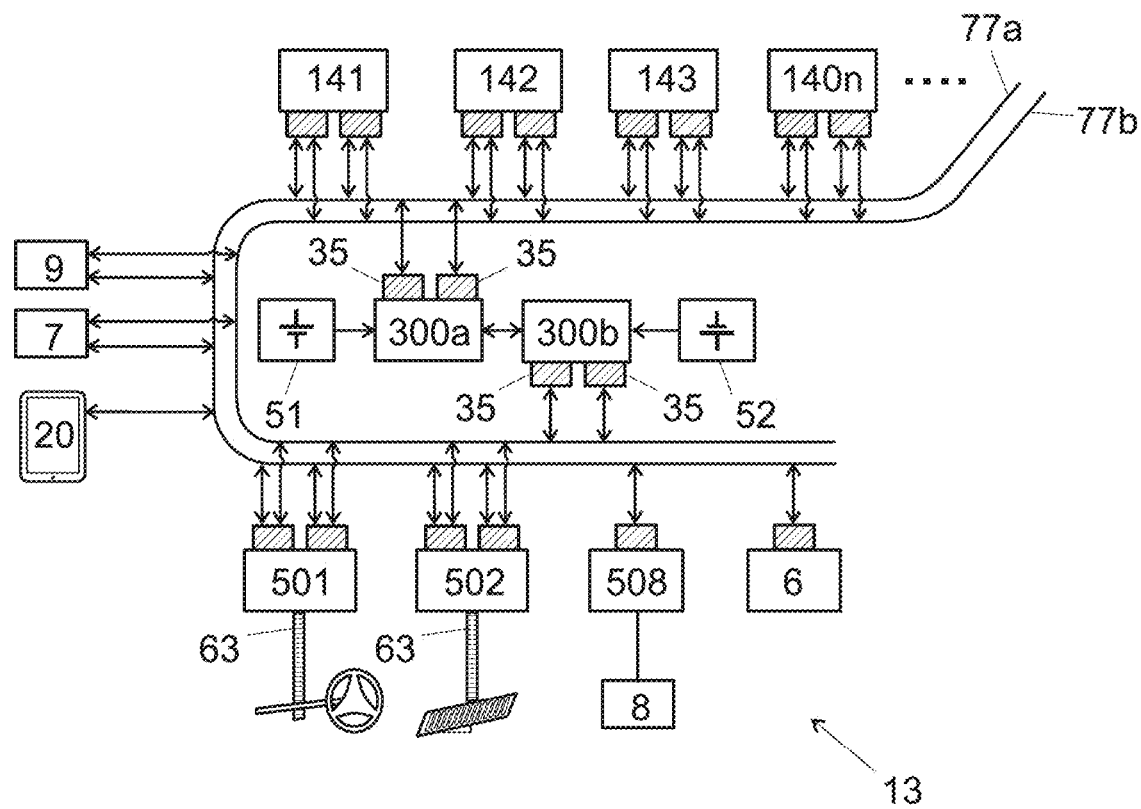

The redundant elements of the input system, or of the control system shown in FIG. 1b, are in this preferred embodiment in a two strand form, resulting in a dual redundancy. Two-stranded means that the function of the redundant element can be performed by an electrical element and/or a combination of electrical elements representing the first strand, as well as by a second electrical component, or a combination of components which represents the second strand. The two strands are mutually redundant. The two strands are mutually independent. The two strands are designed in such a way that they can communicate with each other. This dual redundancy based on redundant elements, each of which is two-stranded, contributes significantly to the safety of the system.

Figure 2A:
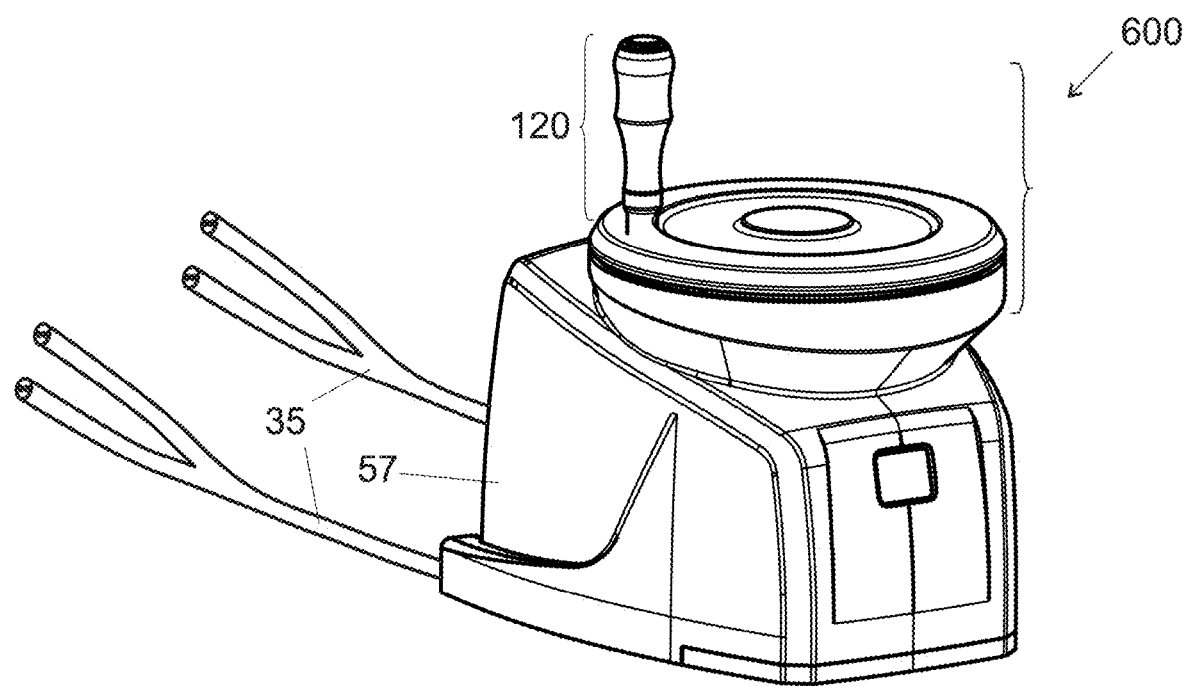
FIGS. 2a and 2b show a schematic view of an exemplary embodiment of a steering input module with a mini steering wheel, wherein
  2a shows a three-dimensional view of the module with a housing, and
  2b shows a three-dimensional view of the module without a housing.
Figure 2B:
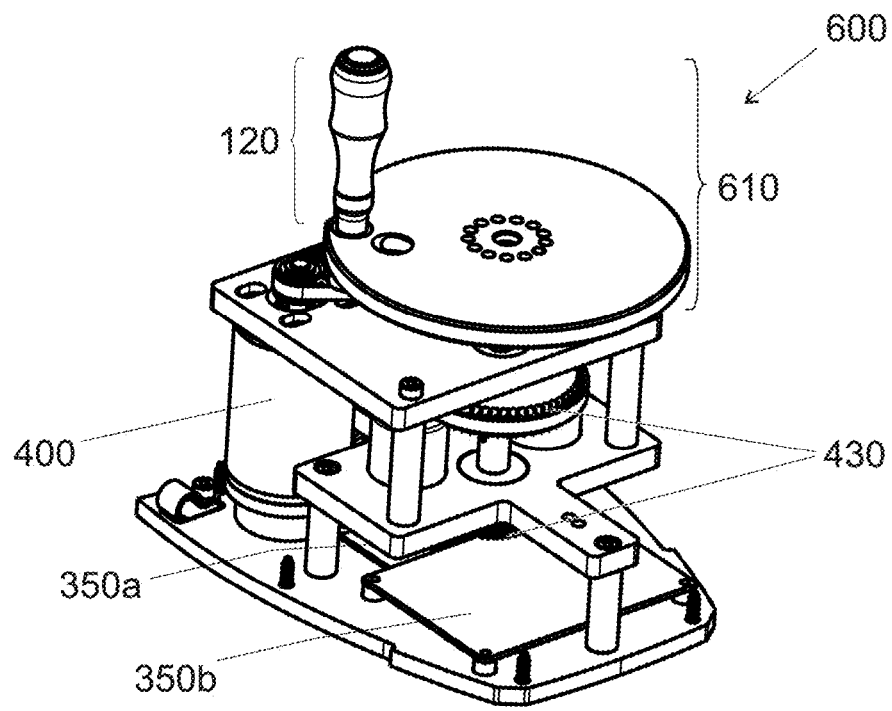

The determination of the position or force or speed of the input element 100 is preferably carried out by means of optical-electrical redundant sensors 200a, 200b, wherein the sensors may be connected to the input element 100 either directly or via a mechanical connection, for example via a gear belt gearbox 430 as illustrated by way of example in FIG. 2b. Depending on the sensors, the electronic circuits 350a, 350b determine a sensor signal and output this via the electrical interfaces 35 to the data bus 77a, 77b. The calculated signal can also be transmitted to an electrical force feedback element 400 of the input module 140. The electronic circuits 350a, 350b are preferably on a printed circuit board (PCB).

The signals output from the electronic circuits 350a, 350b and the data bus 77a, 77b can be retrieved from the data bus 77a, 77b by actuators 501, 502. The actuators 501, 502 are preferably directly mechanically connected to the steering wheel, the steering column or the brake pedal. The actuator may be a steering actuator 501, which is mounted, for example, between the steering wheel and the steering column. A brake actuator 502 is preferably attached to the brake pedal lever. Preferably, the actuators 501, 502 each have two motors. Furthermore, the actuators 501, 502 preferably have redundant electronic interfaces 35 via which signals can be transmitted to the data bus 77a, 77b and received from the data bus 77a, 77b.

To control the acceleration function, actuators are preferably not used to operate the accelerator pedal. Instead, acceleration signals may be transmitted to the engine control unit 8 of the vehicle purely electrically, in analog or digital form, via an electronic acceleration module 508 connected to the data bus 77a, 77b. In this case, the accelerator pedal of the vehicle is completely excluded from the signal transmission.

Signals for controlling secondary functions, such as lights, indicators, windshield wipers and horn can also be transmitted directly via the data bus 77a, 77b to the vehicle electronics 6.

Actuators 501, 502 may be equipped with an electronic motor control element, which is preferably on a printed circuit board (PCB). The motor control element forms the power electronics for the motors of the respective actuator 501, 502. To avoid electromagnetic interference, the motor control element is positioned in close proximity to the respective actuator 501, 502. Preferably, the motor control element is mounted in the vehicle in a concealed manner, for example behind the dashboard.

Furthermore, the actuators 501, 502 preferably have an internal angle sensor system, so-called <<encoders>>, which transmits signals regarding the orientation of the control element to the data bus 77a, 77b. These signals are thus transmitted to the relevant point, preferably to the electronic circuit 350 of the input element.

The electronic circuits 350a, 350b are equipped to receive signals via the redundant electrical interfaces 35 and to include these signals in the calculation of the feedback message on the one hand and/or in the calculation of the signals for the control of the vehicle on the other hand. In this case, the electronic circuit can receive signals of the engine control unit 8, the vehicle electronics 6 and/or the actuators 501, 502, for example via the data bus 77a, 77b.

The electronic circuits 350a, 350b are thus the central element of the signal feedback between the input element 100 and the vehicle's own controller. There is thus a closed control loop here, a so-called <<closed loop>>, whose signals are determined and adjusted by means of the electronic circuits 350a, 350b.

The electronic circuits 350a, 350b generate a feedback signal and transmit it to the force feedback arrangement 400, preferably a feedback motor, of the input module 140. The force feedback is carried out, for example, mechanically by means of a toothed belt drive on the input element 100.

The force feedback 400 may affect the operation of the input element 100, for example by dynamically changing the force required to move the input element.

The main function of the redundant central distributor modules 300a, 300b is to coordinate the internal signal transmission between the elements connected to the data bus 77a, 77b. The central distributor module 300a, 300b serves as a communication interface between the individual modules. It receives information and/or error messages of the individual elements of the control system and forwards them via the data bus 77a, 77b.

Preferably, the central distributor module 300a, 300b is also equipped to perform system-specific diagnostic calculations.

However, calculations are mainly carried out in situ in the relevant modules. For example, a battery management system (<<BMS>>) present in the redundant batteries 51, 52 determines the battery level, while the redundant electronic circuits 350a, 350b calculate a force feedback signal. The redundant electronic circuits 350a, 350b are the primary control intelligence that calculates, parameterizes and/or stores the force feedback, steering curves, braking curves and/or other control-relevant information.

The modularity of the control system 13 is essentially based on the fact that the distributor module 300a, 300b recognizes what the installed configuration of the input module 140, for example only steering, only throttle/ brake, or all three functions, and/or the control system and adjusts the information transmission accordingly. On the other hand, the distributor module 300a, 300b also recognizes all modules and/or elements connected to the data bus 77a, 77b.

Furthermore, the central distributor module 300a, 300b also serves as an interface of the signal transmission to the outside, i.e. to elements external to the system. This can be carried out either via a data bus interface or wirelessly, for example via Bluetooth.

Preferably, the two strands of the control system are each supplied by a battery 51, 52. The batteries 51, 52 themselves are supplied by the vehicle battery while driving. The central distributor module 300a, 300b converts the supply voltage of the vehicle to the system voltage and charges the batteries 51, 52. The batteries 51, 52 thus ensure a constant power supply of the control system.

The redundant strands of the dual-stranded elements of the control system are capable of detecting their own inadmissibilities. A faulty strand is capable of shutting itself down. The function of the redundant element is then taken over by the second redundant strand alone.

Figure 3:
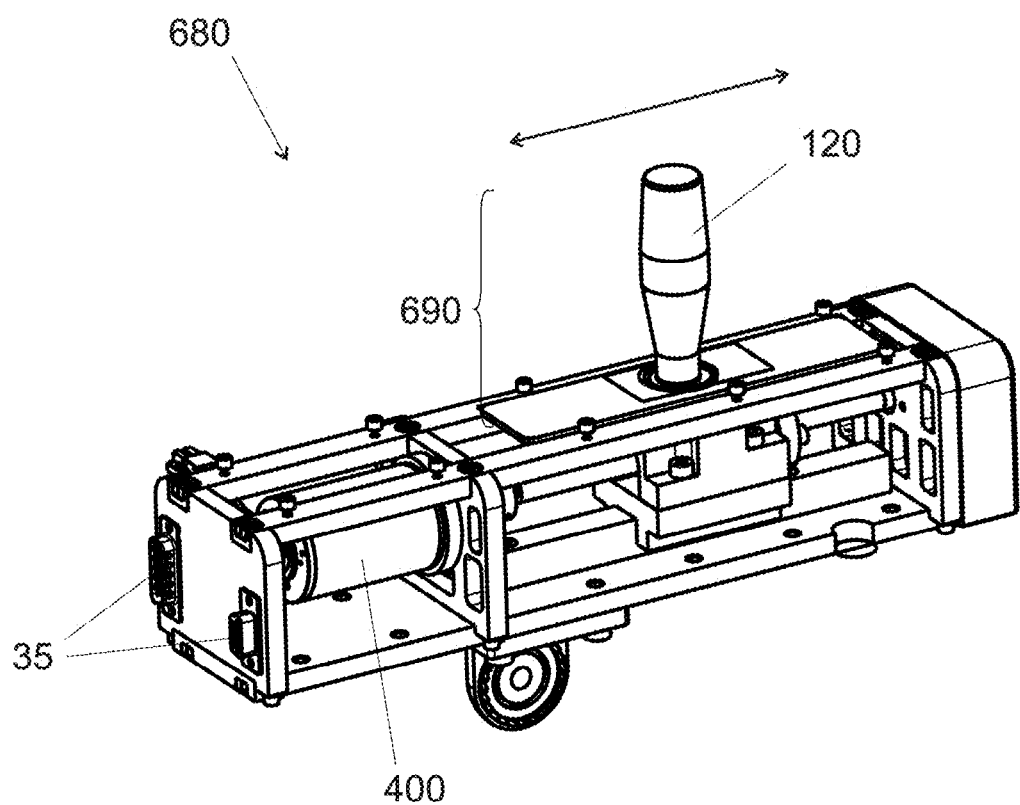
FIG. 3 shows a schematic view of an exemplary embodiment of an acceleration/braking input module with a slider input element without a housing.

In the exemplary embodiment shown in FIGS. 2b and 3, the force feedback element is a force feedback motor. Here the feedback is transmitted to the input element 100 by means of a gearbox 430.

An input module 140 may be provided, for example, for the steering function 141. Optionally, additional input modules 140n may be provided, for example for controlling the secondary functions, such as lights, indicators, windscreen wipers, and/or horn. Input modules can also combine different functions. For example, an input module can be installed for the braking and acceleration function 142, or an input module can be installed for the steering, braking and acceleration function 143. For example, a four-way joystick input module may be provided for combined operation of the steering, braking and acceleration functions. Other combinations and designs are conceivable and possible.

An input module with a slider input element 680, as shown in FIG. 3, can be operated both to control vehicle acceleration and to control braking. In the exemplary embodiment shown, a movement of the slider forwards or in the direction of travel causes acceleration of the vehicle. Retracting the slider in the opposite direction causes a signal to be generated to brake the vehicle. This functionality can also be parameterized inversely, wherein the slider is moved forwards for braking and rearwards for acceleration.

One or each input element 100 is preferably mechanically connected to a corresponding force feedback element 400.

For each input element 100, there are preferably respective dual redundant sensors 200 and a respective force feedback element 400. Each force feedback element 400 transmits a force to an input element 100 associated with it.

The force feedback element 400, the input element 100 and the sensors 200a, 200b are accommodated in the same housing 57, wherein a haptic portion of the input element 120, which can be seen in FIGS. 2 and 3, protrudes from the housing 57 for operation.

Control-relevant information about the driver is entered into the data bus via the input module 140. In addition, the driver can also enter control-relevant information by means of a preferably redundant digital interface 7. For safety reasons, the digital interface 7 can preferably be deactivated by means of an overload switch 9, or signals that are read in via the digital interface 7 can be ignored. In this case, the control functions of the vehicle are again taken over by the input modules 140.

Furthermore, a display unit 20 for retrieving and entering secondary functions can be connected to the data bus 77a, 77b.

The control system can also be adjusted according to driver-specific information, such as the ability to exert a force, reaction speed, information regarding the general driving behavior of the driver, etc. For this purpose, the electronic circuits 350a, 350b can be programmed according to the desired adjustment.

Control-relevant data relating to the vehicle and/or the environment are transmitted by means of the vehicle electronics 6, the acceleration module 508, and/or the actuators 501, 502 to the data bus of the control system. In an analogy to the driver-specific information, information relating to the vehicle or the environment can also be programmed directly into the electronic circuits 350a, 350b.

In a preferred embodiment, the control system comprises a diagnostic interface, such as optical and acoustic status modules or a screen for system-specific information. The diagnostic interface informs the user about any active diagnoses in the control system. The diagnostic interface is connected to the control system via the data bus.

The control system can be activated and deactivated by the ignition of the vehicle by means of an on/off switching function.

Additional redundant switches may be provided to be able to deactivate the control system while driving. This is particularly necessary if the control system is operated without an input element, i.e. autonomously. Accordingly, control of the control functions can be handed over to a safety driver in specific situations.

Furthermore, switches may also be provided for individual elements of specific secondary functions, such as lights, indicators, windscreen wiper system, horn, etc.

Preferably, only the force feedback element 400 can be switched off in the activated control system. Accordingly, the driver can decide whether force feedback while driving is required or not.

A significant advantage of the presented control system is its modular design and the associated interchangeability of the individual modules of the system. Different modules of a control system can be installed independently of each other in the vehicle. On the one hand, a type of input module 140 which is present as a compact unit in its housing 57 can be arbitrarily selected and mounted on the internal equipment of the vehicle. Furthermore, the redundant distributor modules 300a, 300b are installed. Optionally, additional suitable actuators 501, 502 and/or an acceleration module 508 can be mounted in the vehicle. Among other things, this modular design also allows combinations of different subtasks, for example a <<steering only>> or <<acceleration/braking only>> configuration.

The modular elements of the control system 13, specifically the input module 140, the central distributor modules 300a, 300b and, optionally, the actuators 501, 502 are connected to each other and to the vehicle electronics 6 via the data bus 77a, 77b for data and signal exchange. The input module 140, distributor modules 300a, 300b and, optionally, actuators 501, 502 and/or the acceleration module 508 are connected to the data bus via their electrical interfaces 35 in a modular manner. The central distributor modules 300a, 300b recognize the connected elements or modules and ensure that the signal transmission between these elements and/or modules is coordinated. The central distributor modules thus enable the coordinated interaction of the modular system. They are, so to speak, the central management point of the modularity of the control system.

The modular nature of the control system 13 allows the exchange or replacement of the mentioned modules of the control system without having to replace the entire system. This allows great flexibility for the adjustment of a vehicle, also in terms of easy maintenance in the case of a necessary replacement in the field.

A number of different embodiments of the input module are conceivable. In FIG. 2, for example, an input module with a rotary mini steering wheel 610 for controlling the steering function of the vehicle is shown. FIG. 2a shows a mini steering wheel module with a closed housing 57. The horizontally oriented mini steering wheel 610 is rotated by the driver by means of the haptic portion of the input element 120, which in the example shown is a <<pin grip>>.

FIG. 2b shows the same input module without a housing. In the example shown the executed revolutions of the mini steering wheel are transmitted by means of a gearbox 430 to redundant electronics 350a, 350b presented on a circuit board, a PCB. In this exemplary embodiment, two redundant sensors, not apparent here, which can determine the position of the mini steering wheel 610, are mounted on the PCB. Based on this information, the electronic elements 350a, 350b determine sensor signals, which are transmitted via redundant electrical interfaces 35 to the data bus 77a, 77b. Furthermore, the electronic circuits 350a, 350b transmit signals to the feedback motor 400. The electronic circuits 350a, 350b thus control the power transmission of the motor 400 to the input element, in the case shown to the mini steering wheel 610.

In FIG. 3, another possible exemplary embodiment of an input module 140 is shown. This is a slider input module 680 for combined control of accelerator and brake functions. The input module is shown here without its housing. The slider 690 can be moved translationally, preferably in the direction of travel and in the opposite direction. A displacement of the slider in the direction of travel can be used for acceleration, while pulling the slider in the opposite direction causes braking. However, the functions can also be assigned to the respective inverse motion sequences. The electrical interfaces 35 and the force feedback motor 400 can be seen in FIG. 3, the electronic circuits 350a, 350b are hidden in this figure by a cover plate.

Figure 4A:
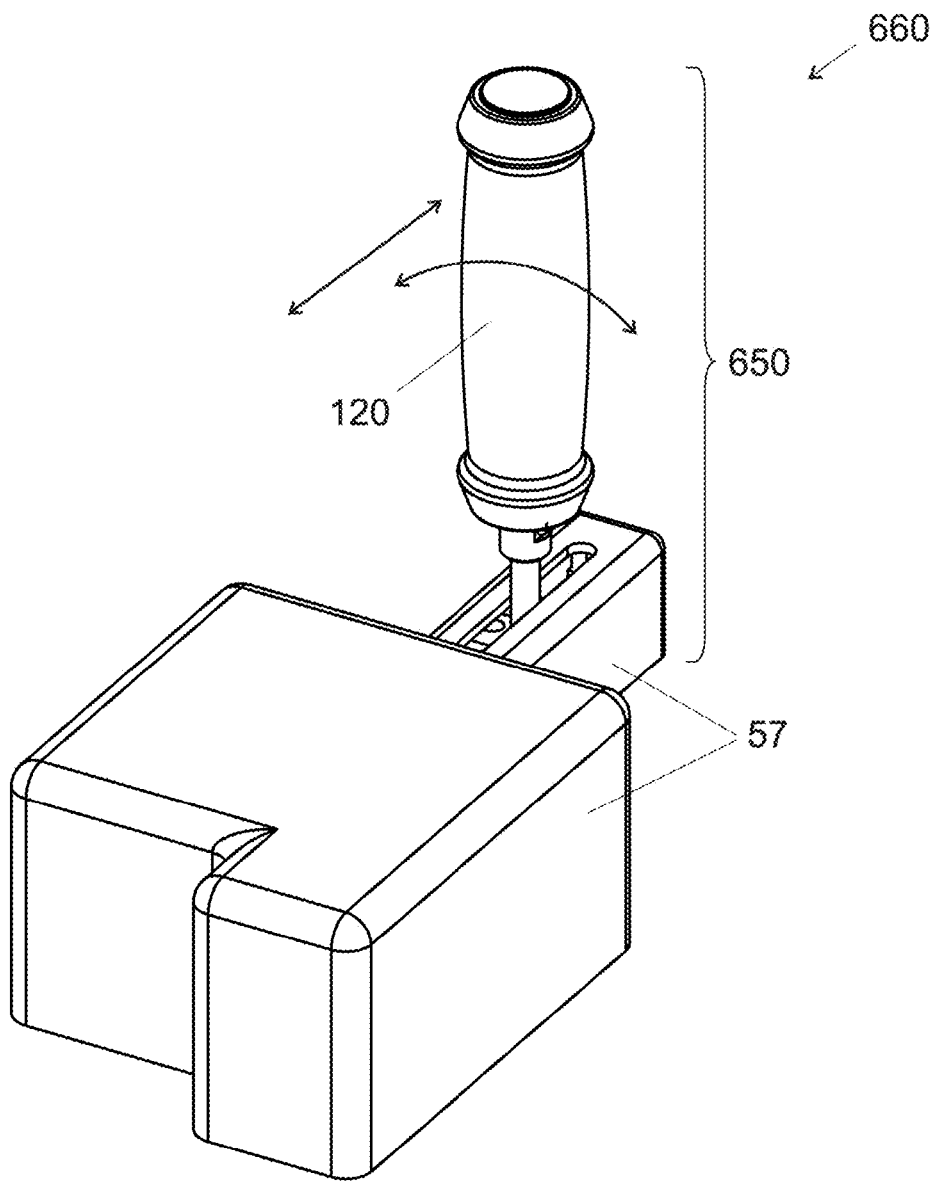
FIGS. 4a to 4c show a schematic view of an exemplary embodiment of a four-way joystick module with an integrated steering, braking and acceleration function, wherein
  4a shows a three-dimensional view of the module with a housing, and
  4b shows a three-dimensional view of the module without a housing;
  4c shows a top view of the module without a housing.
Figure 4B:
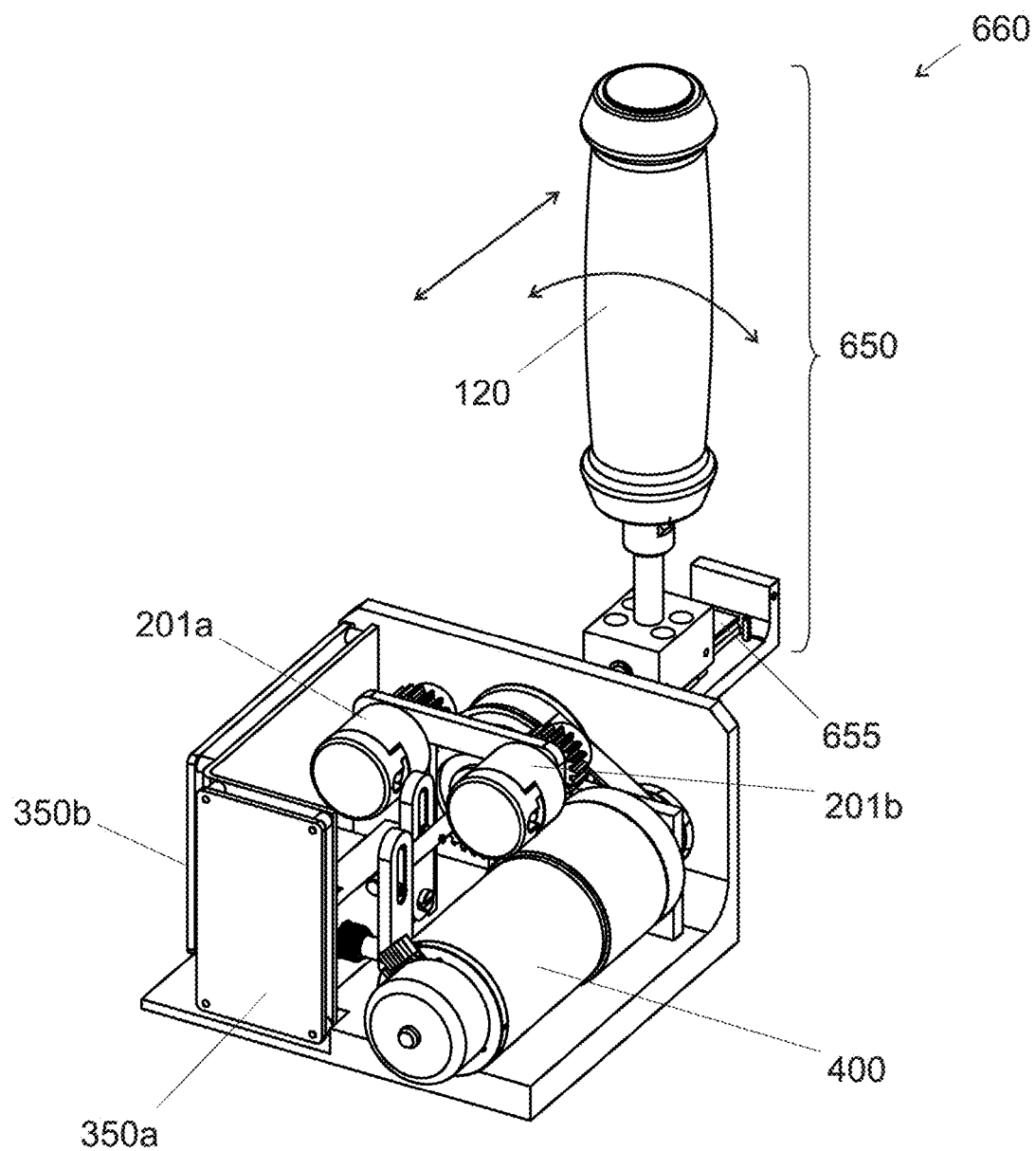
Figure 4C:
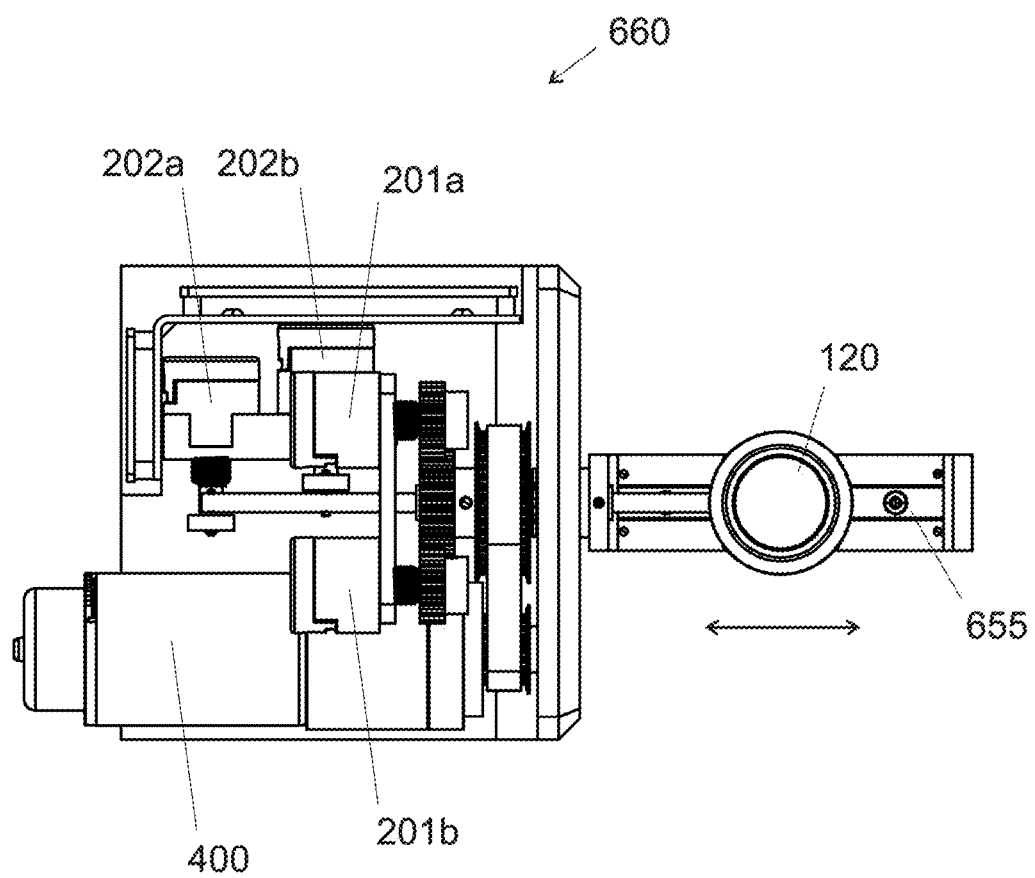

FIGS. 4a, 4b and 4c show a four-way joystick module 660 as a further exemplary embodiment of this invention. In this version, the steering, the acceleration and the braking are operated by a single joystick input element 650. The braking and acceleration function is caused in this module by a translational movement, a displacement, of the joystick 120 along a predetermined axis in the module. The axis may, for example, be predetermined by a guide rail 655. The translational direction of movement is indicated in FIGS. 4a to 4c by an arrow. By moving the joystick in one direction, preferably in the direction of the forward direction of travel of the vehicle, the vehicle is accelerated. Preferably, the extent of acceleration is determined by the traveled path of the joystick, so that a higher acceleration is achieved by a larger displacement.

The brake is operated in this exemplary embodiment by a displacement of the joystick in the opposite direction, preferably the reverse direction of travel of the vehicle. A longer displacement distance of the joystick preferably triggers stronger braking of the vehicle.

However, embodiments are also possible in which the joystick is moved in the forward direction of travel of the vehicle for braking. It is also conceivable to configure the input module in such a way that the joystick must be moved in the reverse direction of travel to accelerate the vehicle.

In addition to the direction and the distance traveled by the joystick, the speed of the translational movement of the joystick, i.e. the operating speed of the joystick, can also be included in the control of acceleration and braking. Thus, a higher movement speed of the joystick can cause greater acceleration or increased braking of the vehicle.

The redundant sensors 202*a*, 202*b* of the input module shown in FIG. 4*c* detect the position of the joystick input element 650 along the predetermined longitudinal axis 655 and determine a redundant sensor signal in each case which is output to the redundant electronic circuits 350*a*, 350*b*.

The steering of the vehicle is controlled in the exemplary embodiment shown in FIGS. 4*a* to 4*c* by means of a rotational movement of the joystick 120. The rotational movement is indicated in FIGS. 4*a* to 4*c* by an arrow. The axis of rotation of this movement preferably corresponds to the predetermined longitudinal axis 655. The rotation angle of the joystick 120 determines the deflection of the vehicle's own steering.

In this embodiment mode the housing 57 comprises two components which are mounted to be rotatable relative to each other to enable the rotary movement of the joysticks 120. In this case, the part comprising the predetermined longitudinal axis 655 together with the joystick performs a rotary movement relative to the other component of the housing.

The rotation of the joystick 120 is detected by the redundant sensors 201*a*, 201*b*. The output sensor signals are calculated in the preferably redundant electronic circuit 350*a*, 350*b*.

The movement of the haptic input element for the longitudinal dynamics of the vehicle, i.e. for acceleration and braking, is preferably separated from the movement of the lateral dynamics, i.e. for the steering.

The embodiment shown in FIGS. 4*a*, 4*b* and 4*c* comprises a single force feedback element 400. In this version, the active force feedback is based on the steering, but not on braking or acceleration.

However, it is also possible to include steering, acceleration and/or braking in the force feedback to the input element. For this purpose, for example, a force feedback element may be provided for a steering-specific feedback and another force feedback element for a braking and acceleration-specific force feedback (not shown).

The modules depicted in the figures are exemplary embodiments of this invention. As already mentioned, in possible embodiments of this invention the housing 57 of the input module 140 encloses the sensors 200*a*, 200*b*, the electronic circuits 350*a*, 350*b*, which are preferably presented in a PCB, the force feedback element 400 and also partly the input element 100. In particular, mechanical interfaces by means of which the input element 100 is connected to the sensors 200*a*, 200*b* and the force feedback element 400 are located inside the housing. The connection points between the mentioned elements of the input module 140 are therefore inaccessible to the driver. In order to provide access to the mentioned interfaces, the housing 57 must be dismantled with suitable tools.

The housing 57 is an integrated unit that may optionally include various components. The individual components are not interchangeable. The housing is therefore not modular. It is also not intended for regular disassembly or regular opening. Preferably, the housing is made of robust but lightweight material, such as a rigid polymer.

One or more input modules 140 are preferably mounted in positions that allow ergonomically favorable operation of the input element 100 by the driver. For example, an input element for the steering function may be mounted to the right side of the driver's seat, while an input element for the braking and/or acceleration function may be mounted to the left side of the driver.

What is claimed is:

1. An input module for controlling a vehicle comprising:
   a haptic input element,
   at least one sensor,
   at least one electronic circuit for determining a sensor signal,
   at least one force feedback element comprising at least one electrical feedback mechanism,
   a housing with at least one electrical interface,
   wherein,
   the input module is intended for retrospective fitting in a vehicle,
   the sensor, the electronic circuit and the force feedback element are completely accommodated in the housing,
   the haptic input element is partially accommodated in the housing so that the input module is present as an integrated device, and
   the at least one electronic circuit is set up so that the calculation of the force feedback can be dynamically adjusted and can be adjusted to suit a specific driver, wherein the adjustment of the force feedback is carried out in a closed control loop in which a force feedback algorithm is performed in the at least one electronic circuit.

2. The input module as claimed in claim 1,
   wherein the sensor, the electronic circuit and the electrical interface are executed redundantly, and
   wherein each sensor, each electronic circuit and/or each electrical interface preferably additionally each have redundant components.

3. The input module as claimed in claim 2, wherein the sensor, the electronic circuit, and the electrical interface are provided in dual execution.

4. A modular control system including:
   an input module as claimed in claim 3,
   a redundant data bus, and
   a central distributor module, which is suitable for receiving signals via the data bus and outputting signals to the data bus.

5. The input module as claimed in claim 2, wherein the braking and acceleration functions, or the steering, braking and acceleration functions, can be performed by means of the same input element.

6. A modular control system including:
   an input module as claimed in claim 2,
   a redundant data bus, and
   a central distributor module, which is suitable for receiving signals via the data bus and outputting signals to the data bus.

7. The modular control system as claimed in claim 6,
   wherein the central distributor module is present in a redundant form, and
   wherein each central distributor module preferably additionally comprises redundant components.

8. The modular control system as claimed in claim 6, further comprising a steering actuator configured to be connected to a vehicle's steering column, a brake actuator configured to be connected to a brake pedal lever, and/or an electronic acceleration module configured to be connected to the vehicle's own engine control unit.

9. The modular control system according to claim 6, which can be installed in the vehicle retrospectively.

10. The input module as claimed in claim 2, wherein the force feedback is increased with increasing driving speed.

11. The input module as claimed in claim 1, wherein the force feedback is increased with increasing driving speed.

12. The input module as claimed in claim 1, wherein the calculation of the force feedback by means of the electronic circuit can be adjusted to suit a specific vehicle.

13. The input module as claimed in claim 1, wherein the braking and acceleration functions, or the steering, braking and acceleration functions, can be performed by means of the same input element.

14. The input module as claimed in claim 13, further configured for controlling lights, indicators, windscreen wipers, and/or horn functions.

15. A modular control system including:
an input module as claimed in claim 1,
a redundant data bus, and
a central distributor module, which is suitable for receiving signals via the data bus and outputting signals to the data bus.

16. The modular control system as claimed in claim 15, wherein the central distributor module is present in a redundant form, and
wherein each central distributor module preferably additionally comprises redundant components.

17. The modular control system according to claim 15, which can be installed in the vehicle retrospectively.

18. A modular control system as claimed in claim 15, wherein the central distributor module is suitable for distributing signals over the data bus so that the signals mentioned can be processed locally in the relevant modules in their electronic circuits.

19. The modular control system as claimed in claim 15, further comprising a digital interface for transmitting a control-relevant signal to the data bus.

20. The modular control system as claimed in claim 15, further comprising a steering actuator configured to be connected to a vehicle's steering column, a brake actuator configured to be connected to a brake pedal lever, and/or an electronic acceleration module configured to be connected to the vehicle's own engine control unit.

21. The modular control system as claimed in claim 20, which can be adjusted while the vehicle is in motion, or can be switched on and off without requiring a mechanical recoupling of the steering actuator, the brake actuator, and/or the acceleration module.

22. The modular control system as claimed in claim 20, which is equipped with a supportive operating mode, which compensates for unwanted friction of the steering actuator, and which can be activated when the vehicle is controlled by the vehicle's own steering.

23. The modular control system as claimed in claim 20, which is equipped with a supportive operating mode, which compensates for undesirable characteristics of the steering actuator, and which can be activated when the vehicle is controlled by the vehicle's own steering.

* * * * *